United States Patent [19]

Glore et al.

[11] 4,403,454
[45] Sep. 13, 1983

[54] BELT SANDER

[75] Inventors: Thomas G. Glore, Easley; Randy G. Koon, Pickens, both of S.C.

[73] Assignee: The Singer Company, Stamford, Conn.

[21] Appl. No.: 259,300

[22] Filed: Apr. 30, 1981

[51] Int. Cl.³ .................... B24B 21/00; B24B 21/18
[52] U.S. Cl. ................... 51/135 BT; 51/148; 474/123; 474/126; 474/136
[58] Field of Search ............ 51/135 BT, 148, 170 EB; 83/817; 198/813, 816; 254/104; 269/234, 309; 474/123, 126, 136

[56] References Cited

U.S. PATENT DOCUMENTS

| | | | |
|---|---|---|---|
| 419,073 | 1/1890 | Richards | 269/234 |
| 621,474 | 3/1899 | Meissner | 474/136 |
| 704,388 | 7/1902 | Schwingel | 198/813 |
| 2,740,238 | 4/1956 | Sharpless | 51/148 |
| 3,359,689 | 12/1967 | McCarty et al. | 474/123 |
| 3,538,650 | 11/1970 | Pollak | 51/148 |

FOREIGN PATENT DOCUMENTS

| | | | |
|---|---|---|---|
| 1033126 | 6/1958 | Fed. Rep. of Germany | 198/813 |
| 1105307 | 4/1961 | Fed. Rep. of Germany | 51/148 |

Primary Examiner—James G. Smith
Assistant Examiner—K. Bradford Adolphson
Attorney, Agent, or Firm—Edward P. Schmidt; Robert E. Smith; Edward L. Bell

[57] ABSTRACT

A stationary or bench mounted belt sander is described constructed of a die cast bed or frame rotatably supporting a drive roll or pulley at one end thereof and provided at the other end portion thereof with generally longitudinal ways for slidably supporting a pair of generally parallel spaced apart outwardly extending generally elongated U-shaped stamped metal yoke or support bracket members provided at their inner or proximal end portions with camming surfaces. The distal ends of the yokes carry pins generally perpendicular thereto supporting a shaft for an idler roll or pulley. The bed or frame is also provided with transverse ways carrying ramp elements engaging the camming surfaces of the yokes, with the ramp elements being provided with transversely outwardly extending screws for cooperation with a nut or internally threaded knob members to pull the ramp members transversely outwardly to thereby cam the yokes longitudinally outwardly for tensioning and tracking adjustment of a sanding belt passed about the drive and idler pulleys. An extension spring spans the bed between the ramp members and the bed, between the pulleys defines a platen. Locking means may also be provided for locking the yokes positively in position.

11 Claims, 3 Drawing Figures

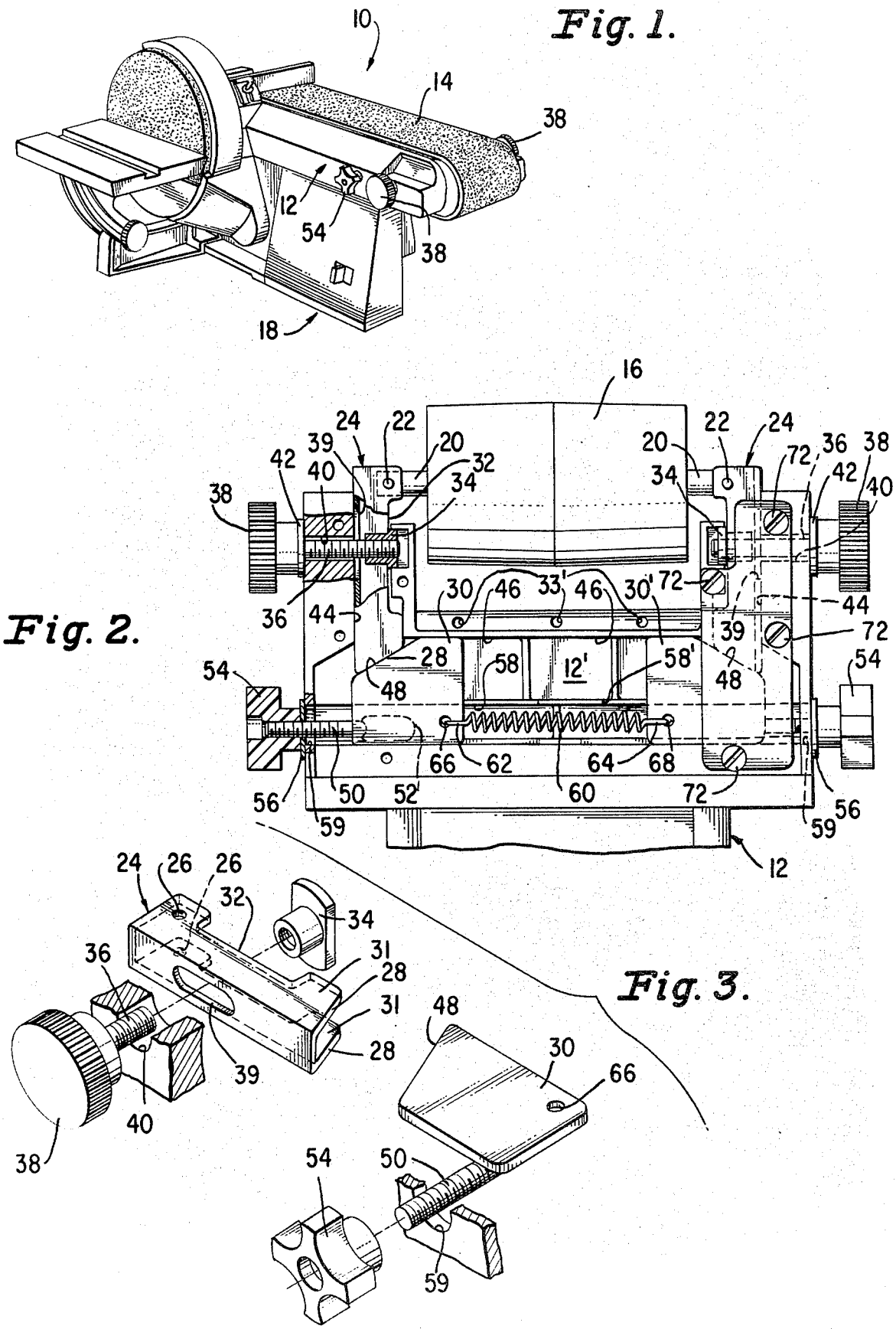

BELT SANDER

DESCRIPTION

FIELD OF THE INVENTION

This invention relates to belt sanders for abrading wood, plastic, metal, or other generally rigid materials and, more particularly, to belt sanders having novel and improved supporting and adjusting mechanism for an idler roll or pulley thereof and to such novel and improved mechanisms and finds particular utility when applied to bench type belt sanders.

BACKGROUND OF THE INVENTION

Belt sanders are generally of two types. A portable tool is designed to be manipulated by the operator over the surface to be sanded. A stationary sander is designed to have the work manipulated relative the sanding machine.

Portable belt sanders are generally utilized to sand flat or slightly convex surfaces and generally have a flat platen fixed between a pair of rollers or pulleys, one at either end of the flat platen. A drive roll or pulley is provided which may comprise one of the two rolls adjacent the end of the platen or may be a yet third roll or pulley spaced apart therefrom. In portable sanders, a housing, drive motor and handle means are provided for grasping and manipulation by the operator. Usually a generally D shaped handle is provided at one end of the tool and the roller at the opposite end is freely rotatable, that is, comprises an idler roll or pulley that is movably supported relative the platen and spring biased outwardly thereof to provide tensioning of the belt. This idler pulley is generally retractable against the spring biasing to release tension and enable belt replacement. Also, one end of the idler pulley support shaft is generally pivoted to the spring biased support structure and separate means are provided for adjusting the angular orientation thereof to provide a tracking adjustment so that the belt runs true.

In stationary belt sanders, on the other hand, a spring biased tensioning mechanism for the idler roll is generally undesirable because sanding is often done on concave surfaces pressed against the moving belt as it traverses around the idler roll. In these machines, a positive adjustment is generally provided for both ends of the idler roll support shaft with both ends being positively adjustable to provide both tensioning of the belt and tracking adjustment therefore.

One form of support mechanism for such an idler roll or pulley of a stationary belt sander providing the track tension and tracking adjustments has employed the use of two parallel slidable pins attached in some manner pivotally at approximate right angles one each to the respective ends of the shaft carrying the idler roll or pulley. Substantial machining is necessary to provide both the pins and the track tension and tracking adjusting mechanisms. In U.S. Pat. No. 3,406,487, on the other hand, there is disclosed a substantially less expensive tensioning and tracking mechanism utilizing eyebolts as the idler roll shaft supports. While this system offers certain advantages, such as relatively low cost, rapid and accurate adjustment thereof is difficult to achieve.

OBJECTS OF THE INVENTION

Accordingly, it is a primary object of the present invention to provide novel and improved belt sanders and idler roll support, tensioning and tracking adjustment means therefore, designed, constructed and arranged to maximize economy of production while simultaneously maintaining ease of operability and adjustment, especially suitable for bench mounted belt sanders.

Another primary object of the present invention, in addition to the foregoing object, is to provide such belt sanders and idler support mechanisms therefore requiring a minimum of machining.

Still another primary object of the present invention, in addition to each of the foregoing objects, is the provision of such belt sanders and idler roll support mechanisms therefore utilizing a die cast bed or frame and stamped metal components in the support mechanism while yet enabling easy assembly and easy and accurate adjustment thereof.

Yet still another primary object of the present invention, in addition to each of the foregoing objects, is the provision of belt sanders and idler roll support, belt tensioning and tracking adjustment mechanisms therefore, utilizing cooperating camming ramp surfaces on metal stampings to provide the tensioning and tracking adjustment thereof.

The invention resides in the combination, construction, arrangement and disposition of the various component parts and elements incorporated in improved belt sanders and idler roll support, tensioning and tracking adjustment mechanisms therefore constructed in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention, a belt sander, particularly a stationary or bench mounted belt sander is constructed of a die cast bed or frame rotatably supporting a drive roll or pulley at one end portion thereof and provided at the other end portion thereof with generally longitudinal ways for slidably supporting a pair of generally parallel spaced apart outwardly extending generally elongated U-shaped stamped metal yoke or support bracket members provided at their inner or proximal end portions with camming surfaces. The distal end portions of the yokes carry pins generally perpendicular thereto supporting a shaft for an idler roll or pulley. The bed or frame is also provided with transverse ways carrying ramp elements engaging the camming surfaces of the yokes, with the ramp elements being provided with transversely outwardly extending screws for cooperation with a nut or internally threaded knob members to pull the ramp members transversely outwardly to thereby cam the yokes longitudinally outwardly for tensioning and tracking adjustment of a sanding belt passed about the drive and idler pulleys.

An extension spring spans the bed between the ramp members and the bed, between the pulleys defines a platen. Locking means may also be provided for locking the yokes positively in position.

BRIEF DESCRIPTION OF THE DRAWING

Further objects of the present invention will appear from the following detailed description and appended claims when read in conjunction with the accompanying drawing wherein:

FIG. 1 is a perspective view of a belt sander constructed in accordance with the principles of the present invention;

FIG. 2 is a view of the forward end portion of the bed assembly of the belt sander of FIG. 1, viewed from below and partially broken away, illustrating the details of the idler roll or pulley support, belt tensioning and tracking adjustment mechanism thereof; and FIG. 3 is an exploded partial perspective view of a portion of the pulley support, belt tensioning and tracking adjustment mechanism.

DETAILED DESCRIPTION OF THE INVENTION

With reference now to the drawing, there is shown and illustrated a combination belt-disc sander constructed in accordance with the principles of the present invention and designated generally by the reference character 10. The sander 10 of the present invention comprises a belt sander bed or frame 12 preferably comprising a unitary, one-piece construction aluminum die casting which rotatably carries a drive pulley fabricated also preferably of die-cast aluminum and which may be rubber covered, although such covering does not appear necessary for operation, for driving a sanding belt 14 which passes therearound and also passes around a nose idler roll or pulley 16 also carried by the bed or frame 12 at a forward end portion thereof. The drive pulley is mounted to a shaft journalled in bearings mounted with the metal frame 12 and the drive pulley shaft also preferably carries drive means, such as a timing or cog belt pulley. The bed or frame 12 is mounted on a support base 18 which is preferably of injected molded plastic construction being fabricated, for example, as a unitary one-piece member comprising a structural plastic foam, preferably foam styrene. Mounted within the base 18 is an electric motor, not shown, which drives the drive pulley by a reinforced rubber timing belt connection.

In order for the sanding belt 14 to be properly and consistently driven, the idler roller pulley 16 needs to be adjustable relative the drive pulley or roll to provide the proper tension to the sanding belt 14 and, additionally, should be adjustable to provide a tracking adjustment so that the sander belt 14 runs straight and true, without moving sideways on the pulleys. In a bench type sander, where the work piece may be pressed against the sanding belt as it traverses around the nose idler pulley 16, it has been found advantageous to provide the tension and tracking mechanism for the nose idler roller or pulley 16 as a positive adjustment of the bearing supports for both ends of the shaft 20 upon which the nose idler roll or pulley 16 is journalled. To provide such means for supporting the nose idler roll or pulley 16 and for tensioning and tracking adjustment of the sanding belt 14, each end of the idler shaft 20 is journalled on a generally vertically extending pin 22 which in turn is carried by a generally horizontally slidable yoke member 24. Each of the yokes 24 comprises a sheet metal, preferably steel, stamping of generally U-shaped cross sectional configuration having a pair of aligned apertures 26 in each leg generally adjacent the forward end portion thereof for receiving pins 22 and with the rearward edges 28 of each of the legs being angulated, as shown, and defining ramp or camming surfaces for engaging contiguous and cooperating ramp members 30 and 30' for moving the yokes 24 generally longitudinally forwardly and backwardly relative the bed or frame 12.

The yokes 24 are preferably identical and provided with the camming surfaces or ramp 28 on both legs so as to be reversible and usable on either the left or right hand side of the bed or frame 12. As will be pointed out hereinafter, it is only the lowermost one of the camming or ramp surfaces 28 that is utilized on the left or right hand side of the bed or frame 12. The intermediate portions of each of the side legs 31 of the yokes 24 are notched, as indicated by the reference character 32 to provide a pair of spaced apart, generally parallel surfaces against which a weldnut flange may be engaged for clamping the yoke 24 against a wall 44 of the bed or frame 12.

The bed or frame casting, as will be readily appreciated by those having skill in the art, is preferably not solid. Rather, it is preferably generally hollow so that sections thereof do not vary too much in thickness, and especially thick sections are generaly avoided. Hence, the bed or frame casting may comprise a generally planar belt supporting platen surface 12', and various ribs and walls depending downwardly therefrom, some of which merely provide reinforcement, and some of which define guiding surfaces for the yokes 24, and the ramp members to be described hereinafter, and the like. However, for simplicity of illustration, and because the details of the frame casting do not form a critical part of the present invention, certain parts of portions of the bed or frame casting have been illustrated as thickened or solid sections. Further, a sheet steel platen surface wear plate may be provided between the platen surface 12' and the sanding belt 14, attached to the upper plane of the platen surface 12', as by screws or rivets engaged therewith in holes 33'.

A screw 36 having a hand knob or nut 38 attached thereto is threaded into each weldnut 34 for clamping the yoke 24 in position and through a slot 39 provided in each yoke 24. The bed or frame 12, adjacent each of the yokes 24 is provided with an aperture 40 for receiving the screw 36 therethrough and a washer 42 may be provided between the hand wheel 38 and the bed or frame 12 surrounding the screws 36.

The bed or frame 12 is provided with a pair of generally longitudinally extending slots or ways 44 for receiving the yokes 24. A transversely extending slot or way 46, also defined by the walls or ribs extending transversely between the slots 44 is also provided for slidably guiding the ramp members 30 and 30'. The ramp members 30 and 30' may also comprise steel stampings, being provided with angulated ramp or camming surfaces 48 for engaging the lowermost one of the cam or ramp surfaces 28 of the yokes 24. Each of the ramp members 30 and 30' is provided with moving means, such as a threaded shaft 50 which may be attached thereto, as by having a swaged weldment portion 52 welded thereto. A threaded knob 54 is threadedly engaged with the threaded shaft 50 and a washer 56 is also provided between the knob and bed or frame 12, so that upon clockwise rotation of the knob 54, the threaded shaft 50 and ramps 30 or 30' are drawn outwardly within the groove 46. A wall or rib 58 may be also provided in the way for supporting the ramp members 30 and 30' and having stop shoulders 58' to limit movement of the ramp members 30 and 30'. Extending outwardly of the bed or frame 12, to provide clearance for the threaded shaft 50, are apertures 59. A coiled tension or extension spring 60 is provided disposed within the slot 46 and having its end loops 62 and 64 engaged with the ramp members 30 and 30', as by being passed through two apertures 66 and 68, respectively, provided therein. A pair of cover plates 70 are provided, secured to the bed or frame 12 as by screws 72 to retain the yokes 24 and ramp members 30 and 30' in position.

To adjust the tension and tracking of the sanding belt 14, the locking knobs 38 are loosened, and the adjustment knobs 54 rotated as appropriate to finely move the ramp members 30 and 30', thereby sliding the yokes 24 longitudinally inwardly and outwardly, independently, to properly finely position the idler roll shaft 20 and idler roll or pulley 16. When properly positioned, the locking knobs 38 are tightened.

While the invention has been described, disclosed, illustrated and shown in terms of a preferred embodiment or modification which has assumed in practice, it to be expressly understood that this has been done for purposes of example, and that the invention is not to be deemed or limited thereby, and that other embodiments or modifications as may be suggested to those having the benefit of the teachings herein are intended to be reserved especially as they fall within the scope and spirit of the claims here appended.

I claim:

1. Idler roll support and tensioning and tracking adjustment means for a belt sander having a die cast bed or frame, comprising: a pair of stamped metal yoke components adapted to be slidable in ways provided longitudinally in said die cast bed or frame and a pair of ramp members adapted to be slidable in transverse ways provided in said die cast bed or frame; each of said stamped metal yoke components comprise a generally U-shaped cross sectional configuration having a pair of legs, each leg having an aperture generally adjacent a forward end portion thereof to provide a pair of aligned apertures; a pivot pin received within said of aligned apertures for pivotally supporting an idler roll support shaft and an idler roll, each leg having rearward edges being angulated and defining ramp or camming surfaces for engaging contiguous and cooperating ramp edges of one of said pair of ramp members for moving the yoke generally longitudinally forwardly and backwardly relative the bed or frame upon sideways movement of said ramp members; said support and tensioning and tracking adjustment means having means for selectively finely positioning said ramp members to obtain individual fine positioning, longitudinally of each of said yoke components, and means for locking each of said yoke components in selected fine positions.

2. Mechanism defined in claim 1 wherein said yokes are identical and provided with said camming surfaces or ramps on both legs so as to be reversible and usable on either the left or right hand side of said bed or frame.

3. Mechanism defined in claim 2 wherein said means for locking comprise an intermediate portion of each of the legs of said yoke are notched to provide a pair of spaced apart generally parallel surfaces against which a weldnut flange may be engaged for clamping the yoke against the bed or frame and further comprising a screw having a hand knob or nut attached thereto threaded into said weldnut for clamping the yoke in position, said yokes being provided with clearance slots therethrough and the bed or frame adjacent each of the yokes being provided with a U-shaped slot for receiving the screw therethrough.

4. Mechanism defined in claim 2 wherein said cooperating ramp edges of said ramp members comprise angulated ramp or camming surfaces for engaging one of the cam or ramp surfaces of the yokes, said means for selectively finely positioning comprising a threaded shaft attached one to each of said ramp members and a threaded knob threadedly engaged one with each of said threaded shafts and impinging on an external surface of said bed so that upon rotation of said knob, said corresponding threaded shaft and ramp are transversely shifted.

5. Belt sander comprising a die cast bed or frame, drive roll, an idler roll, an idler roll support shaft, and an idler roll support and tensioning and tracking adjustment means therefor, said support and tensioning and tracking adjustment means comprising: a pair of stamped metal yoke components slidable in ways provided longitudinally in said die cast bed or frame and a pair of ramp members slidable in transverse ways provided in said die cast bed or frame; each of said stamped metal yoke components comprise a generally U-shaped cross sectional configurations having a pair of legs spaced to receive an end of said idler roll support shaft, each leg having an aperture generally adjacent a forward end portion thereof to provide a pair of aligned apertures, said ends of said idler roll support shaft also having an aperture in alignment with said pair of aligned apertures of said yoke, a pair of pivot pins received within said aligned apertures for pivotally supporting said idler roll support shaft, each leg having rearward edges being angulated and defining ramp or camming surfaces for engaging contiguous and cooperating ramp edges of one of said pair of ramp members for moving the yoke generally longitudinally forward and backwardly relative the bed or frame upon sideways movement of said ramp members; said support and tensioning and tracking adjustment means further comprising means for selectively finally positioning said ramp members to obtain individual fine positioning, longitudinally, of each of said yoke components, and means for locking each of said yoke components in selected fine positions.

6. Belt sander defined in claim 5 wherein said yokes are identical and provided with said camming surfaces or ramps on both legs so as to be reversible and usable on either the left or right hand side of said bed or frame.

7. Belt sander as defined in claim 6 wherein said means for locking comprises an intermediate portion of each of the legs of the said yoke are notched to provide a pair of spaced apart, generally parallel surfaces against which a weldnut flange may be engaged for clamping the yoke against bed or frame and a screw having a hand knob or nut attached thereto threaded into said welnut for clamping the yoke in position, said yokes being provided with clearance slots therethrough and the bed or frame adjacent each of the yokes being provided with a U-shaped slot for receiving the screw therethrough.

8. Belt sander defined in claim 6 wherein said cooperating ramp edges of said ramp members comprise angulated ramp or camming surfaces for engaging one of the cam or ramp surfaces of the yoke, said means for selectively finely positioning comprising a threaded shaft attached one to each of said ramp members and a threaded knob threadedly engaged one with each of said threaded shafts and impinging on external surface of said bed so that upon rotation of said knob, said corresponding threaded shaft and ramp are transversely shifted.

9. Belt sander comprising a die cast bed or frame rotatably supporting a drive roll or pulley at one end portion thereof and provided at the other end portion thereof with generally longitudinal ways for slidably supporting a pair of generally parallel spaced apart outwardly extending generally elongated U-shaped stamped metal yoke or support bracket members, each of said members provided with proximal and distal end portions, said proximal end portions having camming surfaces, pins carried by the distal ends of the yokes generally perpendicular thereto, an idler roll or pulley mounted on a shaft, said pin pivotally supporting said shaft for said idler roll or pulley, the bed or frame being also provided with transverse ways carrying ramp elements engaging the camming surfaces of said yokes, with the ramp elements being provided with transversely outwardly extending screws for cooperation with a nut or internally threaded knob members to shift the ramp members transversely to thereby cam the yokes longitudinally for tensioning and tracking adjustment of a sanding belt passed about the belt drive and idler pulleys.

10. Belt sander defined in claim 9 further comprising an extension spring spanning the bed between the ramp members.

11. Belt sander defined in claim 10 further comprising locking means for locking the yokes positively in position.

* * * * *